United States Patent
Gajda et al.

(10) Patent No.: US 6,457,003 B1
(45) Date of Patent: Sep. 24, 2002

(54) METHODS, SYSTEMS AND COMPUTER PROGRAM PRODUCTS FOR LOGICAL ACCESS OF DATA SOURCES UTILIZING STANDARD RELATIONAL DATABASE MANAGEMENT SYSTEMS

(75) Inventors: Kimberly Lynn Gajda, Raleigh, NC (US); Robert Tod Thorpe, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/375,111

(22) Filed: Aug. 16, 1999

(51) Int. Cl.$^7$ ............................................. G06F 17/30
(52) U.S. Cl. ..................... 707/4; 707/3; 707/1; 707/100
(58) Field of Search ........................ 707/1, 2, 10, 102, 707/4, 3, 100

(56) References Cited

U.S. PATENT DOCUMENTS

| | | | |
|---|---|---|---|
| 5,133,068 A | 7/1992 | Crus et al. | 707/100 |
| 5,379,419 A | 1/1995 | Heffernan et al. | 707/4 |
| 5,701,453 A | 12/1997 | Maloney et al. | 707/2 |
| 5,734,887 A | 3/1998 | Kingberg et al. | 707/4 |
| 5,794,229 A | 8/1998 | French et al. | 707/2 |
| 5,909,570 A * | 6/1999 | Webber | 395/500 |
| 5,937,402 A * | 8/1999 | Pandit | 707/4 |
| 5,937,409 A * | 8/1999 | Wetherbee | 707/103 |
| 5,970,490 A * | 10/1999 | Morgenstern | 707/10 |
| 6,185,574 B1 * | 2/2001 | Howard et al. | 707/200 |
| 6,236,996 B1 * | 5/2001 | Bapat et al. | 707/9 |
| 6,237,003 B1 * | 5/2001 | Lewish et al. | 707/101 |

* cited by examiner

*Primary Examiner*—Greta L. Robinson
(74) *Attorney, Agent, or Firm*—J. Bruce Schelkopf; Myers Bigel Sibley & Sajovec, P.A.

(57) ABSTRACT

Methods, systems and computer program products are provided which allow for accessing at least one data source by intercepting a command to a standard relational database management system and determining if the intercepted command accesses the data source utilizing a logical table name. If the intercepted command accesses the data source utilizing the logical table name, then the logical table name is translated to a physical table name. The intercepted command is the provided to the relational database management system utilizing the physical table name translated from the logical table name so as to provide access the data source utilizing the logical table name. Furthermore, if the intercepted command accesses the data source utilizing a logical table name and a logical column name, then the logical table name is translated to the physical table name and the logical column name translated to a physical column name.

39 Claims, 5 Drawing Sheets

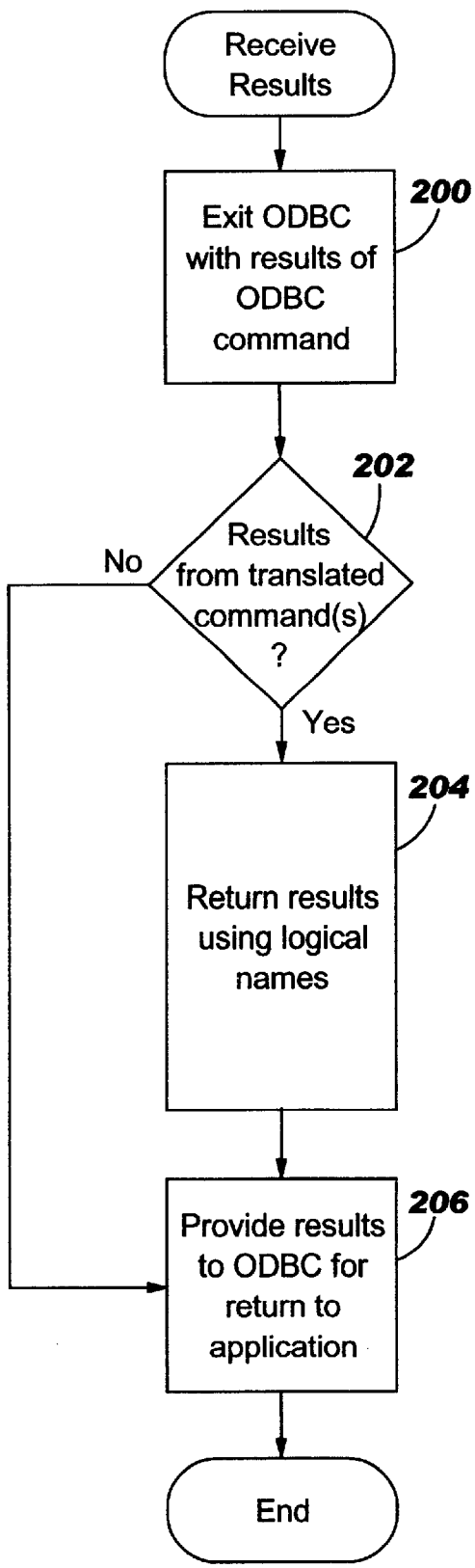

METHODS, SYSTEMS AND COMPUTER PROGRAM PRODUCTS FOR LOGICAL ACCESS OF DATA SOURCES UTILIZING STANDARD RELATIONAL DATABASE MANAGEMENT SYSTEMS

FIELD OF THE INVENTION

The present invention relates to accessing data sources such as relational databases and non-relational data sources. More particularly, the present invention relates to accessing such data sources utilizing a standard relational database management system interface such as the Open Database Connectivity (ODBC) system.

BACKGROUND OF THE INVENTION

Conventional relational database management systems allow for data to be accessed based on a physical table definition. The physical table definition provides a physical disk location for the information stored in the database. Such a system may provide satisfactory results in many applications, however, if the database is accessed by different applications, then changes in the database must typically be reflected via changes to the different applications. Thus, a change in the underlying data structure may require changes to each of the applications which access the data merely to retain their existing functions. Furthermore, conventional relational database management systems may be limited in their ability to access non-relational data such as keyed, binary and sequential files.

Efforts to isolate the underlying physical structure of relational databases have included allowing the use of synonyms as logical names for tables and allowing views to contain data from more than one table. However, the use of synonyms may be limiting in the ability to isolate physical data information from end-user applications as knowledge of the underlying physical structure may still be required in that synonyms have typically not been provided for individual column definitions.

One system for isolating physical information about a database from the applications accessing the database is described in commonly assigned U.S. Pat. No. 5,734,887 to Kingberg et al. (the disclosure of which is incorporated herein) which describes a system for logical access of relational databases. However, the Kingberg et al. system may require a separate database driver which provides logical access. Thus, applications which currently utilize standard relational database management systems, such as ODBC, may require modification to be compatible with the system of Kingberg et al. Furthermore, Kingeberg et al. may not provide access to non-relational data sources utilizing logical access.

In light of the above discussion, a need exists for improvements in the access of differing data sources without requiring the applications to have knowledge of the physical structure of the accessed data sources.

SUMMARY OF THE INVENTION

In view of the above discussion, it is an object of the present invention to provide data source access without requiring knowledge of the underlying physical structure of the data source.

A further object of the present invention is to provide access to both relational and non-relational data sources utilizing a logical data model.

Still another object of the present invention is to provide logical access to data sources utilizing a standard database management system interface such as the ODBC interface.

Yet another object of the present invention is to allow for modifications in underlying data source structures without requiring revisions to applications which access the data sources.

A further object of the present invention is to provide access to data sources which is backward compatible with applications utilizing existing data source access interfaces.

These and other objects of the present invention may be provided by methods, systems and computer program products which access at least one data source by intercepting a command to a relational database management system and determining if the intercepted command accesses the data source utilizing a logical table name. If the intercepted command accesses the data source utilizing the logical table name, then the logical table name is translated to a physical table name. The intercepted command is then provided to the relational database management system utilizing the physical table name translated from the logical table name so as to provide access the data source utilizing the logical table name.

In a further embodiment of the present invention, if the intercepted command accesses the data source utilizing a logical table name and a logical column name, then the logical table name is translated to the physical table name and the logical column name translated to a physical table name. The intercepted command is then provided to the relational database management system utilizing the physical table name translated from the logical table name and the physical column name translated from the logical column name so as to provide access the data source utilizing the logical table name and the logical column name.

By intercepting commands to a standard relational database management system and then translating logical information in the commands to physical information, access to data sources may be provided without requiring knowledge of the underlying physical structure of the data source, only knowledge of the logical model. By providing access to data sources utilizing a logical model, modifications in underlying data source structures may be made without requiring revisions to applications which access the data sources. Furthermore, by utilizing a standard database management system interface application programmers need not learn a new custom interface but may utilize existing database access drivers to access the data source.

In a still further embodiment of the present invention, it is determined if additional relational database management system commands are required to provide the function of the intercepted relational database management system command utilizing the physical table name and the physical column name. If so, then the additional database management system commands are generated utilizing physical table names and physical column names and the generated commands are provided to the relational database management system utilizing the physical table name and the physical column name so as to provide access the data source utilizing the logical table name and the logical column name. Thus, the present invention provides for instances where the commands which would be generated if the application were aware of the underlying physical structure of the data sources differ from those which are generated based on the logical model of the data sources.

In a particular embodiment of the present invention, the intercepted command is provided to the relational database management system if the intercepted command does not contain a logical table name. Preferably, the relational database management system comprises an Open Database Connectivity (ODBC) system. Furthermore, an ODBC compatible application program may generate the intercepted command. In such an instance, where the intercepted command comprises an ODBC query, the interception of the ODBC query may be performed by exiting the ODBC command processing function subsequent to the ODBC command processing function parsing the ODBC query to determine a type of command associated with the ODBC query.

By utilizing ODBC, the present invention provides logical access to data sources utilizing a standard database management system. Furthermore, the present invention may provide compatibility with existing applications which are aware of the underlying physical structure of the data sources by passing the commands on if logical information is not included in the commands. Thus, the present invention may provide access to data sources which is backward compatible with applications utilizing existing data source access interfaces.

In another embodiment of the present invention, a plurality of data sources are accessed and a plurality of logical column names are associated with the intercepted command. In such a case, a first of the plurality of logical column names may be translated to a first physical column name associated with a first of the plurality of data sources and a second of the plurality of logical column names may be translated to a second physical column name associated with a second of the plurality of data sources. The intercepted command may then be provided to the relational database management system utilizing the first physical column name associated with the first of the plurality of data sources and utilizing the second physical column name associated with the second of the plurality of data sources. Furthermore, at least one of the first and the second of the plurality of data sources may be a relational database and at least one of the first and the second of the plurality of data sources may be a non-relational data source.

In a particular embodiment of the present invention, the translation from logical information to physical information may accomplished by accessing a table of metadata wherein the metadata defines a relationship between the logical table name and the physical table name and mapping the logical table name to the physical table name utilizing the metadata. Preferably, the table of metadata is a relational table.

Furthermore, when the data source is a plurality of data sources a logical model may be defined for accessing data from the plurality of data sources. Metadata may then be generated which describes a relationship between the logical model and data stored in a plurality of data sources. The generated metadata may then be stored as the table of metadata. The relationship between the logical model and the data stored in the plurality of data sources may then be revised by revising the metadata and updating the table of metadata to reflect the revised metadata. Thus, the present invention may provide access to both relational and non-relational data sources utilizing a logical data model.

As will further be appreciated by those of skill in the art, the present invention may be embodied as methods, apparatus/systems and/or computer program products.

BRIEF DESCRIPTION OF THE DRAWINGS

FIG. 5 is a flowchart illustrating operations responsive to receiving results from a data source access according to the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention can be embodied as systems, methods, or a computer program products for accessing data sources utilizing a logical data model and mapping the logical data model to physical data locations. As used herein, the prefix "logical" refers to a designation which does not allow direct access to a data source through a database management system. The prefix "physical" is utilized herein to refer to a designation which may be use to directly access a data source by providing the designation to a database management system. As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 1:
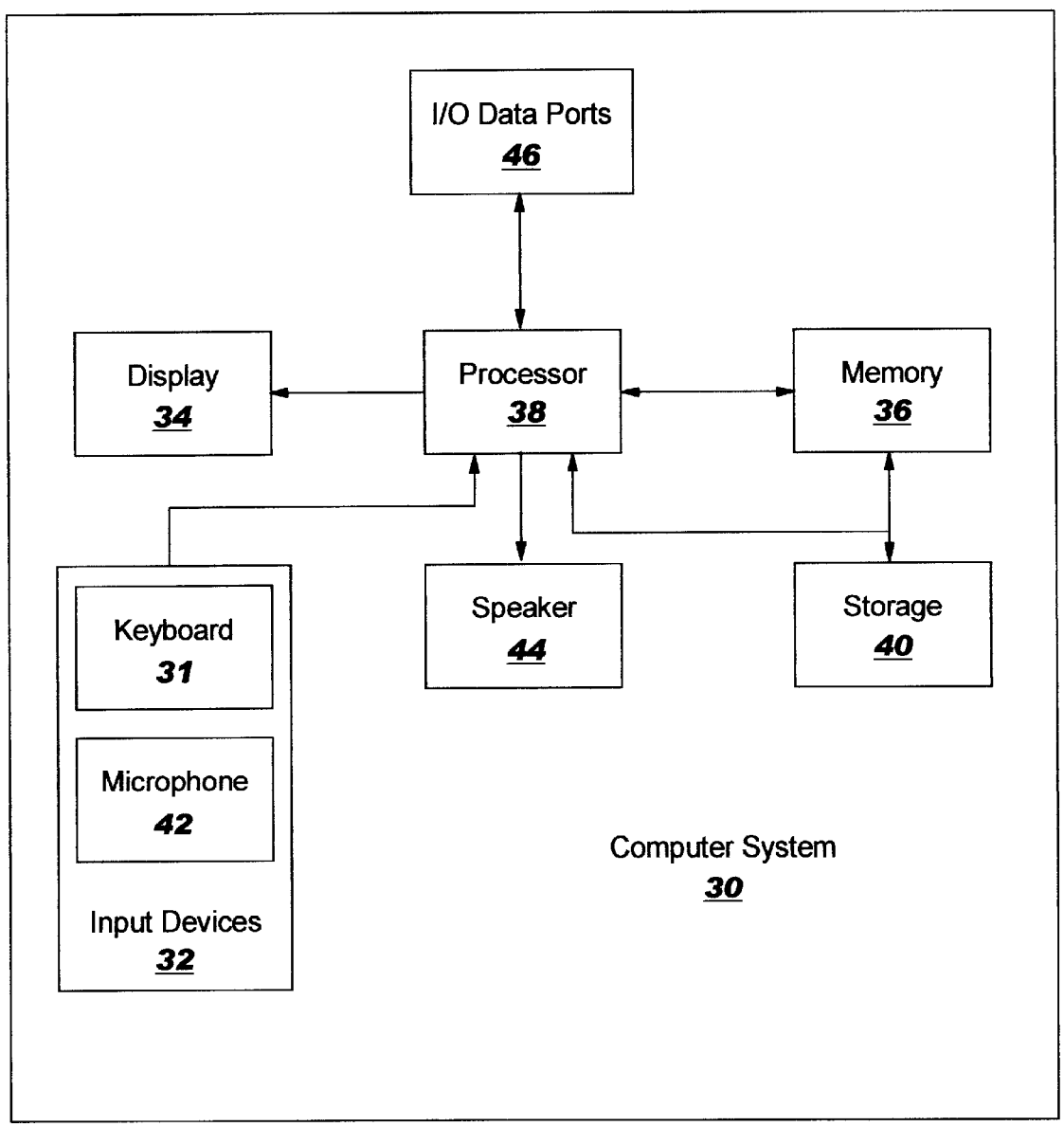
FIG. 1 is diagram of a data processing system that can be used with the present invention.

Referring now to FIG. 1, an exemplary embodiment of a computer system 30 in accordance with the present invention typically includes input devices 32, such as a keyboard or keypad 31, and/or a microphone 42. The computer system 30 also preferably includes a display 34 and a memory 36 that communicate with a processor 38. The computer system 30 may further include a speaker 44 and an I/O data port(s) 46 that also communicate with the processor 38. The I/O data ports 46 can be used to transfer information between the computer system 30 and another computer system or a network (e.g., the Internet). FIG. 1 also illustrates that computer system 30 may include a storage device 40 which communicates with memory 36 and processor 38. Such a storage device may be any type of data storage device as described above. These components are included in many conventional computer systems (e.g., desktop, laptop, or handheld computers) and their functionality is generally known to those skilled in the art.

Furthermore, while the present invention is described with respect to the computer system 30, as will be appreciated by those of skill in the art, the present invention may be incorporated into many other devices which perform data access utilizing a standard relational database management system and, thus, may comprise an embedded function in many other devices. Thus, the present invention should not be construed as limited to use in computer systems such as illustrated in FIG. 1 but may be incorporated in any device having sufficient processing capabilities to carry out the operations described below.

Figure 2:
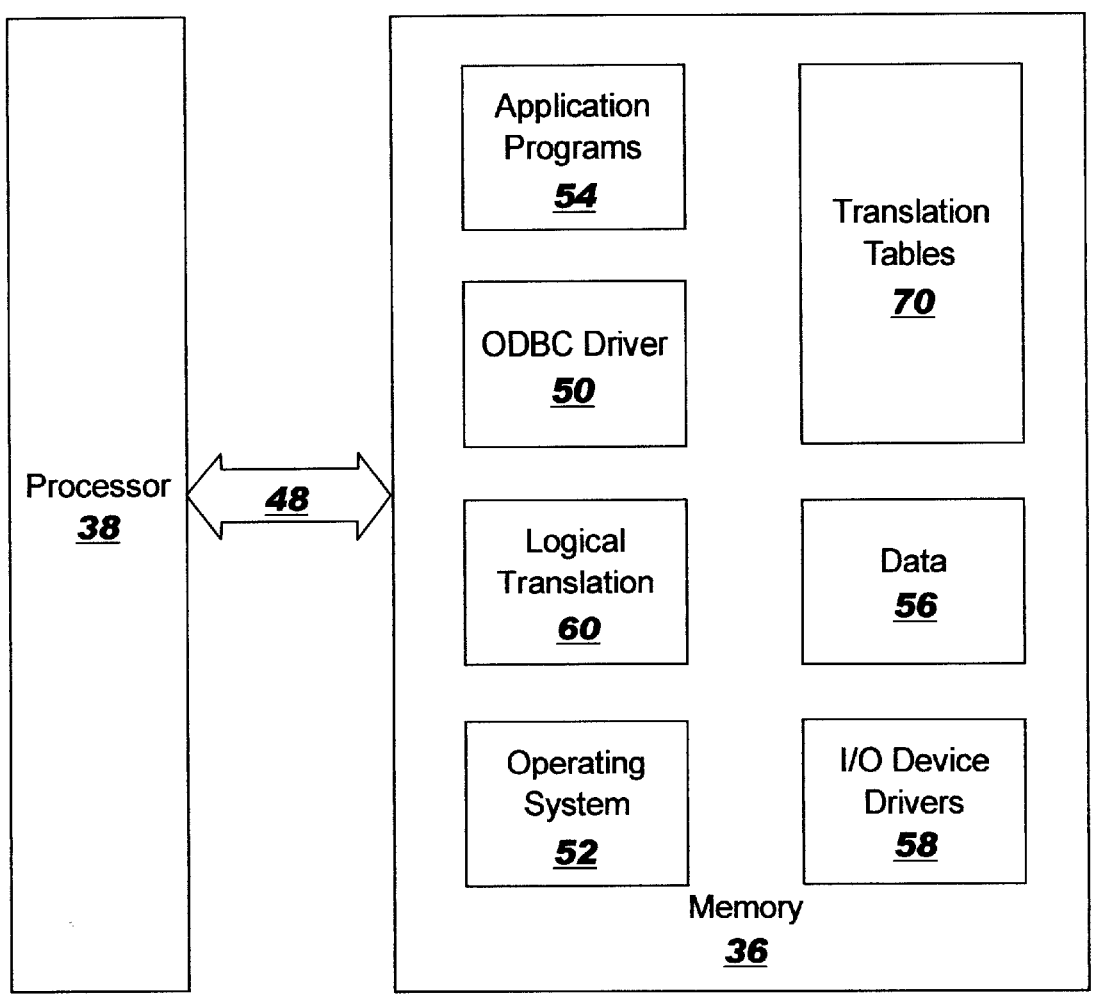
FIG. 2 is a detailed view of a data processing system that can be used with the present invention.

FIG. 2 is a more detailed block diagram of the computer system 30 that illustrates one application of the teachings of the present invention. The processor 38 communicates with the memory 36 via an address/data bus 48. The processor 38 can be any commercially available or custom microprocessor or other processing system capable of carrying out the operations of the present invention. The memory 36 is representative of the overall hierarchy of memory devices containing the software and data used to implement the functionality of the computer system 30. The memory 36 can include, but is not limited to, the following types of devices: cache, ROM, PROM, EPROM, EEPROM, flash, SRAM, and DRAM.

As shown in FIG. 2, the memory 36 may include several major categories of software and data used in the computer system 30: the operating system 52; the application programs 54; the ODBC driver 50; the logical translation module 60; the input/output (I/O) device drivers 58; and the data 56. The I/O device drivers 58 typically include software routines accessed through the operating system 52 by the application programs 54 to communicate with devices such as the input devices 32, the display 34, the speaker 44, the microphone 42, the I/O data port(s) 46, and certain memory 36 components. The application programs 54 comprise the programs that implement the various features of the computer system 30 and preferably include at least one application module or object for accessing data sources utilizing the ODBC driver 50. The ODBC driver 50 is preferably part of a standard relational database management system which provides access to relational data sources and preferably includes the ability to exit the ODBC driver 50 to provide relational database commands to the logical translation module 60 for translation. More preferably, the ODBC driver 50 is associated with a relational database management system such as International Business Machine Corporation's DataJoiner which provides access to both relational and non-relational data sources. Alternatively, the logical translation module 60 could intercept commands intended for the ODBC driver 50, perform the logical to physical translation as described below, and then provide the translated commands to the ODBC driver 50.

Finally, the data 56 represents the static and dynamic data used by the application programs 54, operating system 52, I/O device drivers 58, ODBC driver 50, logical translation module 60 and any other software program that may reside in the memory 36. As illustrated in FIG. 2, the data 56 preferably includes translation tables 70 which may provide translation for relational and non-relational data sources. However, as will be appreciated by those of skill in the art, the translation tables need not be maintained in memory. Additional intermediate data (not shown) may also be stored in memory. Furthermore, while the present invention is described as a translation module executing on computer system 30, as will be appreciated by those of skill in the art, the present invention may be implemented in any number of manners, including incorporation in operating system 52 or directly in ODBC driver 50. Also, while a single set of translation tables are illustrated in FIG. 2, as will be appreciated by those of skill in the art, a single set of tables could be utilized or multiple sets of tables utilized. Thus, the present invention should not be construed as limited to the particular partitioning of functions or information as illustrated in FIG. 2.

The present invention will now be described with respect to FIGS. 3, 4 and 5 which are block diagrams and flowchart illustrations of embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart or block diagram block or blocks. The computer program instructions may be executed by a processor to cause a series of operational steps to be performed by the processor to produce a computer implemented process such that the instructions which execute on the processor provide steps for implementing the functions specified in the flowchart or block diagram block or blocks.

Accordingly, blocks of the block diagrams and/or flowchart illustrations support combinations of means for performing the specified functions, combinations of steps for performing the specified functions and program instruction means for performing the specified functions. It will also be understood that each block of the block diagrams and/or flowchart illustrations, and combinations of blocks in the block diagrams and/or flowchart illustrations, can be implemented by special purpose hardware-based systems which perform the specified functions or steps, or combinations of special purpose hardware and computer instructions.

Figure 3:
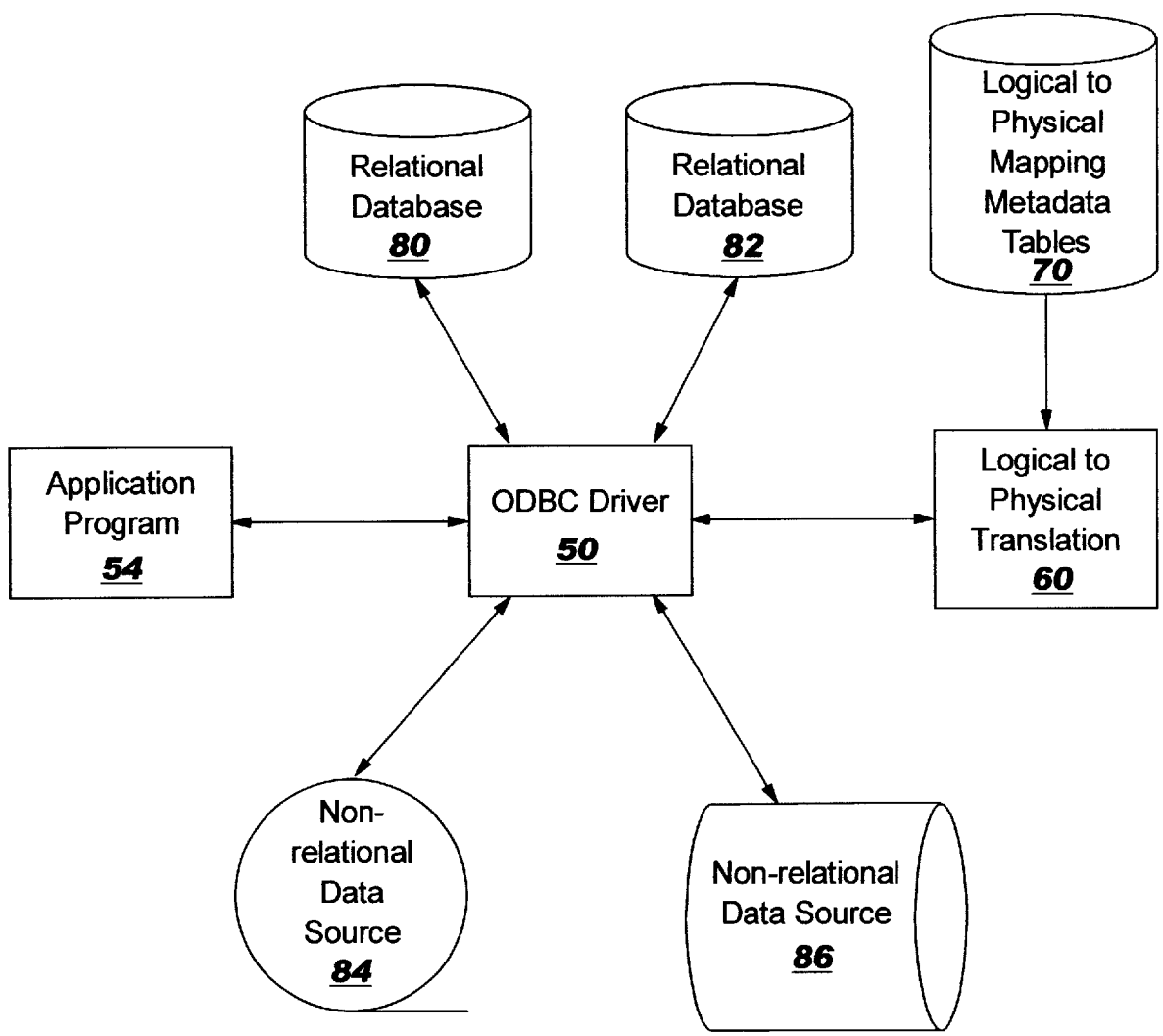
FIG. 3 is block diagram of a logical data access system according to the present invention.

As is illustrated in FIG. 3, an application program 54 provides an ODBC command to the ODBC driver 50. The ODBC driver 50 preferably provides an interface for accessing a standard database management system such as International Business Machine Corporation's DB2 DataJoiner product. Thus, an application which accesses DataJoiner may do so by accessing the ODBC interface of DataJoiner. In any event, the ODBC driver 50 provides the received command to the logical to physical translation module 60. The logical to physical translation module 60 examines the logical information in the command and accesses the logical to physical mapping metadata tables (i.e. the translation tables) 70. Tables 70 contain metadata to translate the command which includes logical information, such as a logical table name and logical column names, into physical information. Thus, for example, a logical table name and a first logical column name could be translated to a physical table name and a physical column name in relational database 80 and a second logical column name could be translated to a physical table name and a physical column name in relational database 82. Similarly, logical table names and logical column names could be translated to physical locations in non-relational data source 84 or non-relational data source 86.

The tables 70 for accessing the relational data sources and the non-relational data sources are preferably stored as relational tables. Preferably, these tables are accessible by other programs, such as DataJoiner for example, to allow DataJoiner to formulate ODBC commands to non-relational data sources so as to provide access as a relational data source. In the case of accessing a relational database, the translation tables may include metadata which provides information for translating logical table names and logical column names to a physical table name and a physical column name. However, in the case of the translation of information from the logical information to physical information for non-relational data sources, these tables preferably include sufficient metadata information to allow access of the non-relational data sources as relational data sources through, for example, the data access facilities provided by DataJoiner. For example, RecordDescription, Attribute, ValidAttribute Values and Index tables may be needed to access non-relational data sources as relational data sources. Such information is described in detail in commonly assigned U.S. Pat. application Ser. No. 09/349,607, entitled "METHOD AND SYSTEM FOR IMPROVED ACCESS TO NON-RELATIONAL DATABASES" the disclosure of which is incorporated herein by reference.

If no translation exists for the logical table name or logical column name, then the information in the ODBC command may be assumed to be physical information that need not be translated. Alternatively, an error message could be generated. In any event, the ODBC command may be returned to the ODBC driver 50 with either the translated physical information in the command or the original non-translated information in the command if no translation exists. The ODBC driver would then process the command in the conventional manner to provide access to the data in the appropriate databases specified in the command and provide any results to the application program 54.

Because of the translation from a logical model to a physical structure, a situation may arise where an ODBC operation which may be carried out with a single command in the logical data model may require multiple ODBC commands when the logical information is translated to physical information. Thus, after translating the logical information to physical information, the logical to physical translation module 60 may also generate additional ODBC commands utilizing physical information to provide the functionality of the original requested ODBC command. These generated commands would then be provided to the ODBC driver 50 for processing in place of or in addition to the original ODBC command.

For example, if an ODBC insert command requests that values be inserted into two different columns of the same logical table but those two columns translate to different physical tables, then the logical to physical translation module would generate two ODBC insert commands to carry out the function requested in the original command. The first ODBC command could insert the data from the first column of the logical table into a column of the first physical table and the second command could insert the data from the second column of the logical table into a column of the second physical table. Other examples, of requested functions which may require the generation of multiple messages will be readily apparent to those of skill in the art in light of the present disclosure. As will be appreciated by those of skill in the art, an analysis of the requested ODBC function and the physical data sources needed to carry out the function provides sufficient information to determine the number, type and data sources needed to carry out the requested function for the logical information.

After processing, the results, if any, from the ODBC commands are also intercepted by the logical to physical translation module 60. The results are then reconstructed to appear as the result of the ODBC command utilizing the logical information and provided to the ODBC driver 50 which may then provide the results to the application 54.

Figure 4:
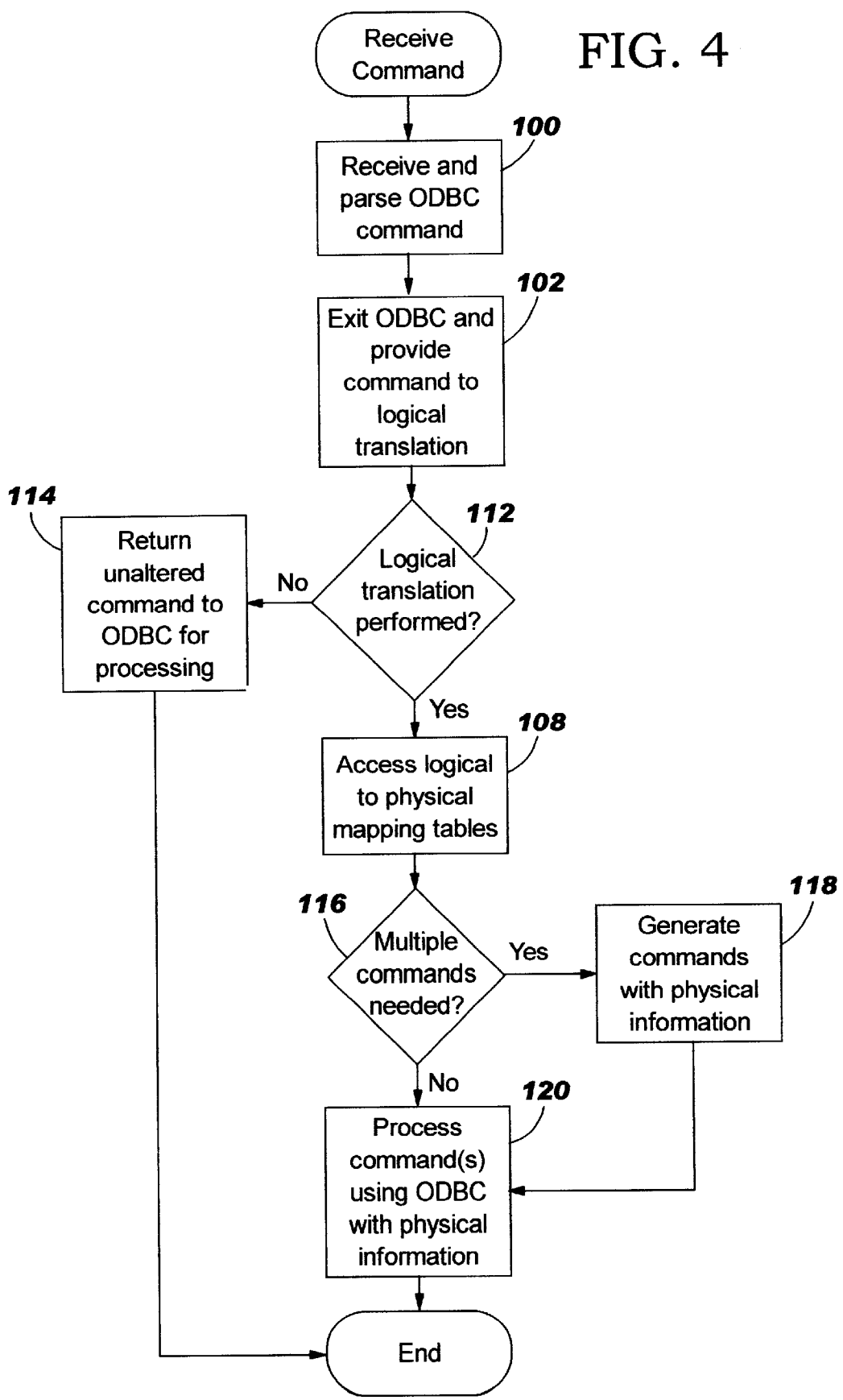
FIG. 4 is a flowchart illustrating data access operations according to one embodiment of the present invention.

FIG. 4 illustrates operations according to a particular embodiment of the present invention in further detail. As seen in FIG. 4, an ODBC command is received by the ODBC driver 50 and parsed to determine the type of command (block 100). The ODBC driver 50 may then be exited and the command and logical information, such as a logical table name and logical column name, provided to the logical to physical translation module 60 (block 102). Thus, the logical to physical translation module 60 need not have command parsing capabilities but may utilize such capabilities of the existing ODBC driver 50. The logical to physical translation module 60 then determines if a logical translation is to be performed (block 112). If a logical translation is not to be performed (block 112), then the unaltered ODBC command is provided to the ODBC driver for further processing (block 114). However, if a logical to physical translation is performed, then the logical to physical mapping tables are accessed (block 108) and it is determined if multiple commands are needed to perform the function requested in the ODBC command received by the ODBC driver (block 116). If multiple commands are needed, then these commands are generated utilizing the obtained physical information from the tables 70 (block 118). The ODBC command or commands incorporating the physical information corresponding to the logical information received in the original ODBC command are then processed by the ODBC driver 50 (block 120).

After the ODBC driver 50 has utilized the physical information for accessing either a relational database, such as databases 80 and 82, or a non-relational data source, such as data sources 84 and 86, the operations of FIG. 5 may be performed. As seen in FIG. 5, when results of an ODBC command are received, ODBC is again exited (block 200) and it is determined if the results are from a translated command (block 202). If so, then the results are returned using the logical information (block 204). In either case, the results are provided to ODBC for return to the application (block 206). Thus, the physical information is isolated from the application that the application only sees logical information. Furthermore, existing ODBC access may also be supported by returning the results unaltered if no translation was performed.

As a specific example of the interaction between the ODBC driver 50 and the logical to physical translation module 60, the ODBC code may be exited in every call to ODBC which accepts an SQL statement as an input parameter including SQLPrepare and SQLExecDirect in order to provide the original statement translation. ODBC would also be exited in the SQLGetData call in order to do the results translation.

While the present invention has been described with respect to exiting the ODBC driver and performing the translation in a logical to physical translation module, as will be appreciated by those of skill in the art, the present invention may be incorporated directly into an ODBC driver. Alternatively, the present invention may be provided as a separate data access layer between an application and the ODBC driver. In such a case, the data access layer would appear to the application as the ODBC driver and would intercept commands to and responses from the ODBC driver and translate the logical information to physical information and the physical information to logical information.

Furthermore, while the present invention has been described with reference to an ODBC driver, as will be appreciated by those of skill in the art, the present invention may be utilized with any standard interface for a relational database management system. In particular, the present invention may be utilized with a Java Database Connectivity (JDBC) driver.

Also, the present invention is not limited to only performing a translation receipt of a command or on receipt of results. For example, when utilized with DataJoiner, and an ODBC command is received with logical information, a translation could be performed which translates the logical information into a DataJoiner "nickname" and then presents the nickname to DataJoiner which could translate the nickname to a remote identifier and then provide this identifier to a low level ODBC driver which would translate the identifier to physical information for access to non-relational data sources. Thus, the non-relational access capabilities of DataJoiner may be utilized to allow access to non-relational data sources as if they were relational data sources while still providing access to all data sources utilizing a logical, rather than a physical, model.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of accessing at least one data source, the method comprising the steps of:
   intercepting a command to a relational database management system;
   determining if the intercepted command accesses the data source utilizing a logical table name;
   translating the logical table name to a physical table name if the intercepted command accesses the data source utilizing the logical table name;
   providing the intercepted command to the relational database management system utilizing the physical table name translated from the logical table name if the intercepted command accesses the data source utilizing the logical table name so as to provide access to the data source utilizing the logical table name;
   wherein the step of determining, the step of translating and the step of providing comprise the respective steps of:
      determining if the intercepted command accesses the data source utilizing a logical table name and a logical column name;
      translating the logical table name to the physical table name if the intercepted command accesses the data source utilizing the logical table name;
      translating the logical column name to a physical table name if the intercepted command accesses the data source utilizing the logical column name; and
      providing the intercepted command to the relational database management system utilizing the physical table name translated from the logical table name and the physical column name translated from the logical column name if the intercepted command accesses the data source utilizing the logical table name and the logical column name so as to provide access to the data source utilizing the logical table name and the logical column name.

2. A method according to claim 1, further comprising the steps of:
   determining if additional relational database management system commands are required to provide the function of the intercepted relational database management system command utilizing the physical table name and the physical column name; and
   generating additional database management system commands utilizing physical table names and physical column names if additional relational database management system commands are required to carry out the operation of the intercepted relational database management system command utilizing the physical table name and the physical column name; and
   wherein the step of providing comprises the step of providing the generated commands to the relational database management system utilizing the physical table name and the physical column name if the intercepted command accesses the database utilizing the logical table name and the logical column name and if additional relational database management system commands are required to carry out the operation of the intercepted relational database management system command so as to provide access to the data source utilizing the logical table name and the logical column name.

3. A method of accessing at least one data source, the method comprising the steps of:
   intercepting a command to a relational database management system;
   determining if the intercepted command accesses the data source utilizing a logical table name;
   translating the logical table name to a physical table name if the intercepted command accesses the data source utilizing the logical table name;
   providing the intercepted command to the relational database management system utilizing the physical table name translated from the logical table name if the intercepted command accesses the data source utilizing the logical table name so as to provide access to the data source utilizing the logical table name; and
   providing the intercepted command to the relational database management system if the intercepted command does not contain a logical table name.

4. A method of accessing at least one data source, the method comprising the steps of:
   intercepting a command to a relational database management system;
   determining if the intercepted command accesses the data source utilizing a logical table name;
   translating the logical table name to a physical table name if the intercepted command accesses the data source utilizing the logical table name;
   providing the intercepted command to the relational database management system utilizing the physical table name translated from the logical table name if the intercepted command accesses the data source utilizing the logical table name so as to provide access to the data source utilizing the logical table name; and wherein the relational database management system comprises an Open Database Connectivity (ODBC) system.

5. A method according to claim 4, wherein an ODBC compatible application program generates the intercepted command.

6. A method according to claim 4, wherein the intercepted command comprises an ODBC query and wherein the step of intercepting comprises the step of exiting the ODBC command processing function subsequent to the ODBC command processing function parsing the ODBC query to determine a type of command associated with the ODBC query.

7. A method according to claim 1, wherein the data source comprises a plurality of data sources and wherein a plurality of logical column names are associated with the intercepted command, the method further comprising:

translating a first of the plurality of logical column names to a first physical column name associated with a first of the plurality of data sources; and translating a second of the plurality of logical column names to a second physical column name associated with a second of the plurality of data sources; and wherein said providing step comprises the step of providing the intercepted command to the relational database management system utilizing the first physical column name associated with the first of the plurality of data sources and utilizing the second physical column name associated with the second of the plurality of data sources.

8. A method according to claim 7, wherein at least one of the first and the second of the plurality of data sources comprises a relational database and at least one of the first and the second of the plurality of data sources comprises a non-relational data source.

9. A method of accessing at least one data source, the method comprising the steps of:

intercepting a command to a relational database management system;

determining if the intercepted command accesses the data source utilizing a logical table name;

translating the logical table name to a physical table name if the intercepted command accesses the data source utilizing the logical table name;

providing the intercepted command to the relational database management system utilizing the physical table name translated from the logical table name if the intercepted command accesses the data source utilizing the logical table name so as to provide access to the data source utilizing the logical table name;

wherein the step of translating comprises the steps of:
accessing a table of metadata wherein the metadata defines a relationship between the logical table name and the physical table name; and
mapping the logical table name to the physical table name utilizing the metadata.

10. A method according to claim 9, wherein the table of metadata comprises a set of relational tables.

11. A method according to claim 9, wherein the data source comprises a plurality of data sources, the method further comprising the steps of:

defining a logical model for accessing data from the plurality of data sources;

generating metadata which describes a relationship between the logical model and data stored in a plurality of data sources; and storing the metadata as the table of metadata.

12. A method according to claim 11, further comprising the steps of:

revising the relationship between the logical model and the data stored in the plurality of data sources by revising the metadata; and updating the table of metadata to reflect the revised metadata.

13. A method according to claim 11, wherein at least one of the plurality of data sources is a non-relational data source and at least one of the plurality of data sources is a relational database.

14. A system for accessing at least one data source, comprising:

means for intercepting a command to a relational database management system;

means for determining if the intercepted command accesses the data source utilizing a logical table name;

means for translating the logical table name to a physical table name if the intercepted command accesses the data source utilizing the logical table name; and means for providing the intercepted command to the relational database management system utilizing the physical table name translated from the logical table name if the intercepted command accesses the data source utilizing the logical table name so as to provide access to the data source utilizing the logical table name;

wherein the means for determining, the means for translating and the means for providing comprise:
means for determining if the intercepted command accesses the data source utilizing a logical table name and a logical column name;

means for translating the logical table name to the physical table name if the intercepted command accesses the data source utilizing the logical table name;

means for translating the logical column name to a physical table name if the intercepted command accesses the data source utilizing the logical column name; and means for providing the intercepted command to the relational database management system utilizing the physical table name translated from the logical table name and the physical column name translated from the logical column name if the intercepted command accesses the data source utilizing the logical table name and the logical column name so as to provide access to the data source utilizing the logical table name and the logical column name.

15. A system according to claim 14, further comprising:

means for determining if additional relational database management system commands are required to provide the function of the intercepted relational database management system command utilizing the physical table name and the physical column name; and means for generating additional database management system commands utilizing physical table names and physical column names if additional relational database management system commands are required to carry out the operation of the intercepted relational database management system command utilizing the physical table name and the physical column name; and wherein the means for providing comprises means for providing the generated commands to the relational database management system utilizing the physical table name and the physical column name if the intercepted command accesses the database utilizing the logical table name and the logical column name and if additional relational database management system commands are required to carry out the operation of the intercepted relational database management system command so as to provide access to the data source utilizing the logical table name and the logical column name.

16. A system for accessing at least one data source, comprising:
   means for intercepting a command to a relational database management system;
   means for determining if the intercepted command accesses the data source utilizing a logical table name;
   means for translating the logical table name to a physical table name if the intercepted command accesses the data source utilizing the logical table name;
   means for providing the intercepted command to the relational database management system utilizing the physical table name translated from the logical table name if the intercepted command accesses the data source utilizing the logical table name so as to provide access to the data source utilizing the logical table name; and
   means for providing the intercepted command to the relational database management system if the intercepted command does not contain a logical table name.

17. A system for accessing at least one data source, comprising:
   means for intercepting a command to a relational database management system;
   means for determining if the intercepted command accesses the data source utilizing a logical table name;
   means for translating the logical table name to a physical table name if the intercepted command accesses the data source utilizing the logical table name;
   means for providing the intercepted command to the relational database management system utilizing the physical table name translated from the logical table name if the intercepted command accesses the data source utilizing the logical table name so as to provide access to the data source utilizing the logical table name; and
   wherein the relational database management system comprises an Open Database Connectivity (ODBC) system.

18. A system according to claim 17, wherein an ODBC compatible application program generates the intercepted command.

19. A system according to claim 17, wherein the intercepted command comprises an ODBC query and wherein the step of intercepting comprises the step of exiting the ODBC command processing function subsequent to the ODBC command processing function parsing the ODBC query to determine a type of command associated with the ODBC query.

20. A system according to claim 14, wherein the data source comprises a plurality of data sources and wherein a plurality of logical column names are associated with the intercepted command, further comprising:
   means for translating a first of the plurality of logical column names to a first physical column name associated with a first of the plurality of data sources; and
   means for translating a second of the plurality of logical column names to a second physical column name associated with a second of the plurality of data sources; and
   wherein said means for providing comprises means for providing the intercepted command to the relational database management system utilizing the first physical column name associated with the first of the plurality of data sources and utilizing the second physical column name associated with the second of the plurality of data sources.

21. A system according to claim 20, wherein at least one of the first and the second of the plurality of data sources comprises a relational database and at least one of the first and the second of the plurality of data sources comprises a non-relational data source.

22. A system for accessing at least one data source, comprising:
   means for intercepting a command to a relational database management system;
   means for determining if the intercepted command accesses the data source utilizing a logical table name;
   means for translating the logical table name to a physical table name if the intercepted command accesses the data source utilizing the logical table name; and
   means for providing the intercepted command to the relational database management system utilizing the physical table name translated from the logical table name if the intercepted command accesses the data source utilizing the logical table name so as to provide access to the data source utilizing the logical table name;
   wherein the means for translating comprises:
      means for accessing a table of metadata wherein the metadata defines a relationship between the logical table name and the physical table name; and
      means for mapping the logical table name to the physical table name utilizing the metadata.

23. A system according to claim 22, wherein the table of metadata comprises a set of relational tables.

24. A system according to claim 22, wherein the data source comprises a plurality of data sources, further comprising:
   means for defining a logical model for accessing data from the plurality of data sources;
   means for generating metadata which describes a relationship between the logical model and data stored in a plurality of data sources; and
   means for storing the metadata as the table of metadata.

25. A system according to claim 24, further comprising:
   means for revising the relationship between the logical model and the data stored in the plurality of data sources by revising the metadata; and
   means for updating the table of metadata to reflect the revised metadata.

26. A system according to claim 24, wherein at least one of the plurality of data sources is a non-relational data source and at least one of the plurality of data sources is a relational database.

27. A computer program product for accessing at least one data source, comprising:
   a computer readable storage medium having computer readable program code means embodied in said medium, said computer readable program code means comprising:
   computer readable program code means for intercepting a command to a relational database management system;
   computer readable program code means for determining if the intercepted command accesses the data source utilizing a logical table name;

computer readable program code means for translating the logical table name to a physical table name if the intercepted command accesses the data source utilizing the logical table name;

computer readable program code means for providing the intercepted command to the relational database management system utilizing the physical table name translated from the logical table name if the intercepted command accesses the data source utilizing the logical table name so as to provide access to the data source utilizing the logical table name;

wherein the computer readable program code means for determining, the computer readable program code means for translating and the computer readable program code means for providing comprise:

computer readable program code means for determining if the intercepted command accesses the data source utilizing a logical table name and a logical column name;

computer readable program code means for translating the logical table name to the physical table name if the intercepted command accesses the data source utilizing the logical table name;

computer readable program code means for translating the logical column name to a physical table name if the intercepted command accesses the data source utilizing the logical column name; and computer readable program code means for providing the intercepted command to the relational database management system utilizing the physical table name translated from the logical table name and the physical column name translated from the logical column name if the intercepted command accesses the data source utilizing the logical table name and the logical column name so as to provide access to the data source utilizing the logical table name and the logical column name.

28. A computer program product according to claim 27, further comprising:

computer readable program code means for determining if additional relational database management system commands are required to provide the function of the intercepted relational database management system command utilizing the physical table name and the physical column name; and computer readable program code means for generating additional database management system commands utilizing physical table names and physical column names if additional relational database management system commands are required to carry out the operation of the intercepted relational database management system command utilizing the physical table name and the physical column name; and wherein the computer readable program code means for providing comprises computer readable program code means for providing the generated commands to the relational database management system utilizing the physical table name and the physical column name if the intercepted command accesses the database utilizing the logical table name and the logical column name and if additional relational database management system commands are required to carry out the operation of the intercepted relational database management system command so as to provide access to the data source utilizing the logical table name and the logical column name.

29. A computer program product for accessing at least one data source, comprising:

a computer readable storage medium having computer readable program code means embodied in said medium, said computer readable program code means comprising:

computer readable program code means for intercepting a command to a relational database management system;

computer readable program code means for determining if the intercepted command accesses the data source utilizing a logical table name;

computer readable program code means for translating the logical table name to a physical table name if the intercepted command accesses the data source utilizing the logical table name;

computer readable program code means for providing the intercepted command to the relational database management system utilizing the physical table name translated from the logical table name if the intercepted command-accesses the data source utilizing the logical table name so as to provide access to the data source utilizing the logical table name; and computer readable program code means for providing the intercepted command to the relational database management system if the intercepted command does not contain a logical table name.

30. A computer program product for accessing at least one data source, comprising:

a computer readable storage medium having computer readable program code means embodied in said medium, said computer readable program code means comprising:

computer readable program code means for intercepting a command to a relational database management system;

computer readable program code means for determining if the intercepted command accesses the data source utilizing a logical table name;

computer readable program code means for translating the logical table name to a physical table name if the intercepted command accesses the data source utilizing the logical table name;

computer readable program code means for providing the intercepted command to the relational database management system utilizing the physical table name translated from the logical table name if the intercepted command accesses the data source utilizing the logical table name so as to provide access to the data source utilizing the logical table name; and wherein the relational database management system comprises an Open Database Connectivity (ODBC) system.

31. A computer program product according to claim 30, wherein an ODBC compatible application program generates the intercepted command.

32. A computer program product according to claim 30, wherein the intercepted command comprises an ODBC query and wherein the step of intercepting comprises the step of exiting the ODBC command processing function subsequent to the ODBC command processing function parsing the ODBC query to determine a type of command associated with the ODBC query.

33. A computer program product according to claim 27, wherein the data source comprises a plurality of data sources and wherein a plurality of logical column names are associated with the intercepted command, further comprising:

computer readable program code means for translating a first of the plurality of logical column names to a first physical column name associated with a first of the plurality of data sources; and computer readable program code means for translating a second of the plurality of logical column names to a second physical column name associated with a second of the plurality of data sources; and wherein said computer readable program code means for providing comprises computer readable program code means for providing the intercepted command to the relational database management system utilizing the first physical column name associated with the first of the plurality of data sources and utilizing the second physical column name associated with the second of the plurality of data sources.

34. A computer program product according to claim 33, wherein at least one of the first and the second of the plurality of data sources comprises a relational database and at least one of the first and the second of the plurality of data sources comprises a non-relational data source.

35. A computer program product for accessing at least one data source, comprising:

a computer readable storage medium having computer readable program code means embodied in said medium, said computer readable program code means comprising:

computer readable program code means for intercepting a command to a relational database management system;

computer readable program code means for determining if the intercepted command accesses the data source utilizing a logical table name;

computer readable program code means for translating the logical table name to a physical table name if the intercepted command accesses the data source utilizing the logical table name;

computer readable program code means for providing the intercepted command to the relational database management system utilizing the physical table name translated from the logical table name if the intercepted command accesses the data source utilizing the logical table name so as to provide access to the data source utilizing the logical table name;

wherein the computer readable program code means for translating comprises:

computer readable program code means for accessing a table of metadata wherein the metadata defines a relationship between the logical table name and the physical table name; and computer readable program code means for mapping the logical table name to the physical table name utilizing the metadata.

36. A computer program product according to claim 35, wherein the table of metadata comprises a set of relational tables.

37. A computer program product according to claim 35, wherein the data source comprises a plurality of data sources, further comprising;

computer readable program code means for defining a logical model for accessing data from the plurality of data sources;

computer readable program code means for generating metadata which describes a relationship between the logical model and data stored in a plurality of data sources; and computer readable program code means for storing the metadata as the table of metadata.

38. A computer program product according to claim 37, further comprising:

computer readable program code means for revising the relationship between the logical model and the data stored in the plurality of data sources by revising the metadata; and computer readable program code means for updating the table of metadata to reflect the revised metadata.

39. A computer program product according to claim 37, wherein at least one of the plurality of data sources is a non-relational data source and at least one of the plurality of data sources is a relational database.

* * * * *